United States Patent [19]

Are

[11] 4,213,057
[45] Jul. 15, 1980

[54] WIND ENERGY CONVERSION DEVICE

[76] Inventor: Endel Are, 119 E. Lucy St., Florida City, Fla. 33034

[21] Appl. No.: 903,487

[22] Filed: May 8, 1978

[51] Int. Cl.² ............................................. F03D 1/02
[52] U.S. Cl. ......................................... 290/44; 416/11
[58] Field of Search .................... 290/44, 55; 416/128, 416/175, 11

[56] References Cited

U.S. PATENT DOCUMENTS

| | | | |
|---|---|---|---|
| 1,498,978 | 6/1924 | Muntz | 290/55 X |
| 2,145,511 | 1/1939 | Grohmann | 290/44 |
| 2,177,801 | 10/1939 | Erren | 290/55 |
| 2,784,556 | 3/1957 | Perdue | 290/55 X |
| 3,697,765 | 10/1972 | Carini | 290/44 X |
| 3,942,026 | 3/1976 | Carter | 290/55 |
| 4,048,947 | 9/1977 | Sicard | 290/55 X |
| 4,093,035 | 6/1978 | Fletcher | 290/44 X |

Primary Examiner—Gene Z. Rubinson
Assistant Examiner—W. E. Duncanson, Jr.

[57] ABSTRACT

A wind energy conversion device comprised of an elongated generally cylindrical housing provided with oppositely pitched multi-bladed rotors at the fore and aft ends thereof which are directly coupled respectively to internal and external rotors of an electric generator. The device is pivotally mounted atop a mast in an off center relation to the fore and aft rotors, the pivot being positioned substantially closer to the front rotor. Electrical wiring conducts the energy produced by the generator to storage batteries which are connected to an inverter to produce an AC output. Appropriate ampere, DC and AC voltage gauges as well as a shut-off switch are included in the electrical system.

23 Claims, 3 Drawing Figures

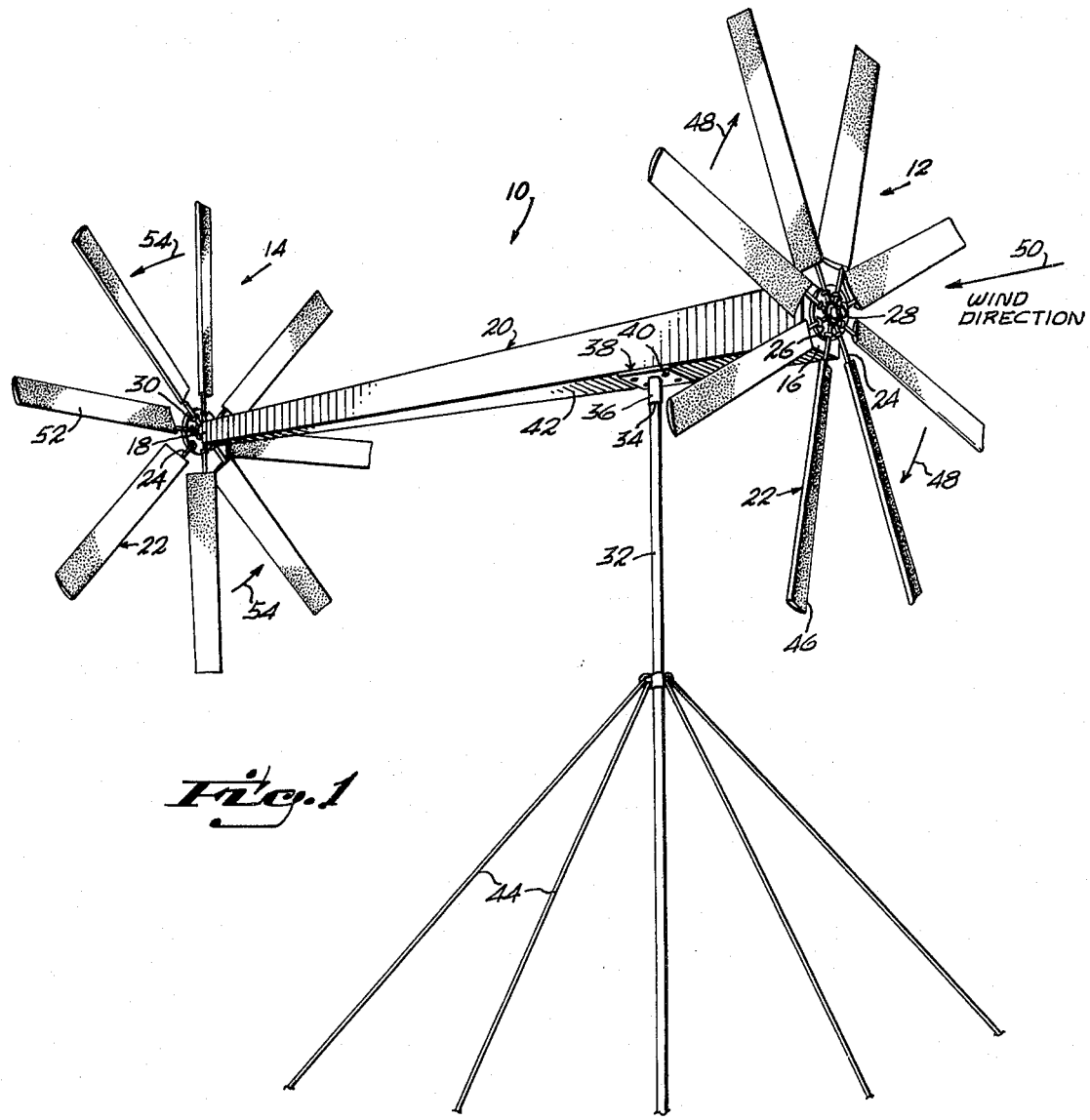
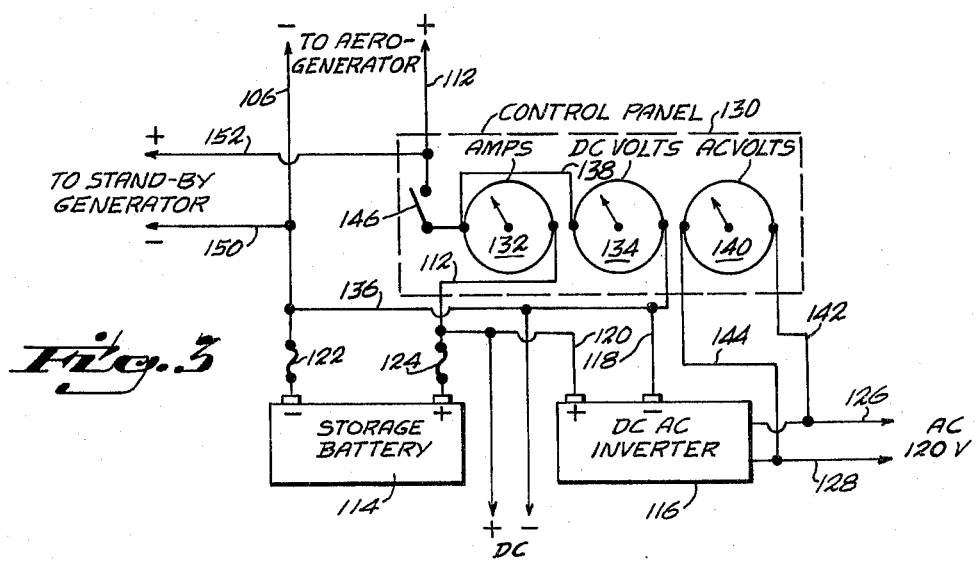
Fig.1
Fig.3

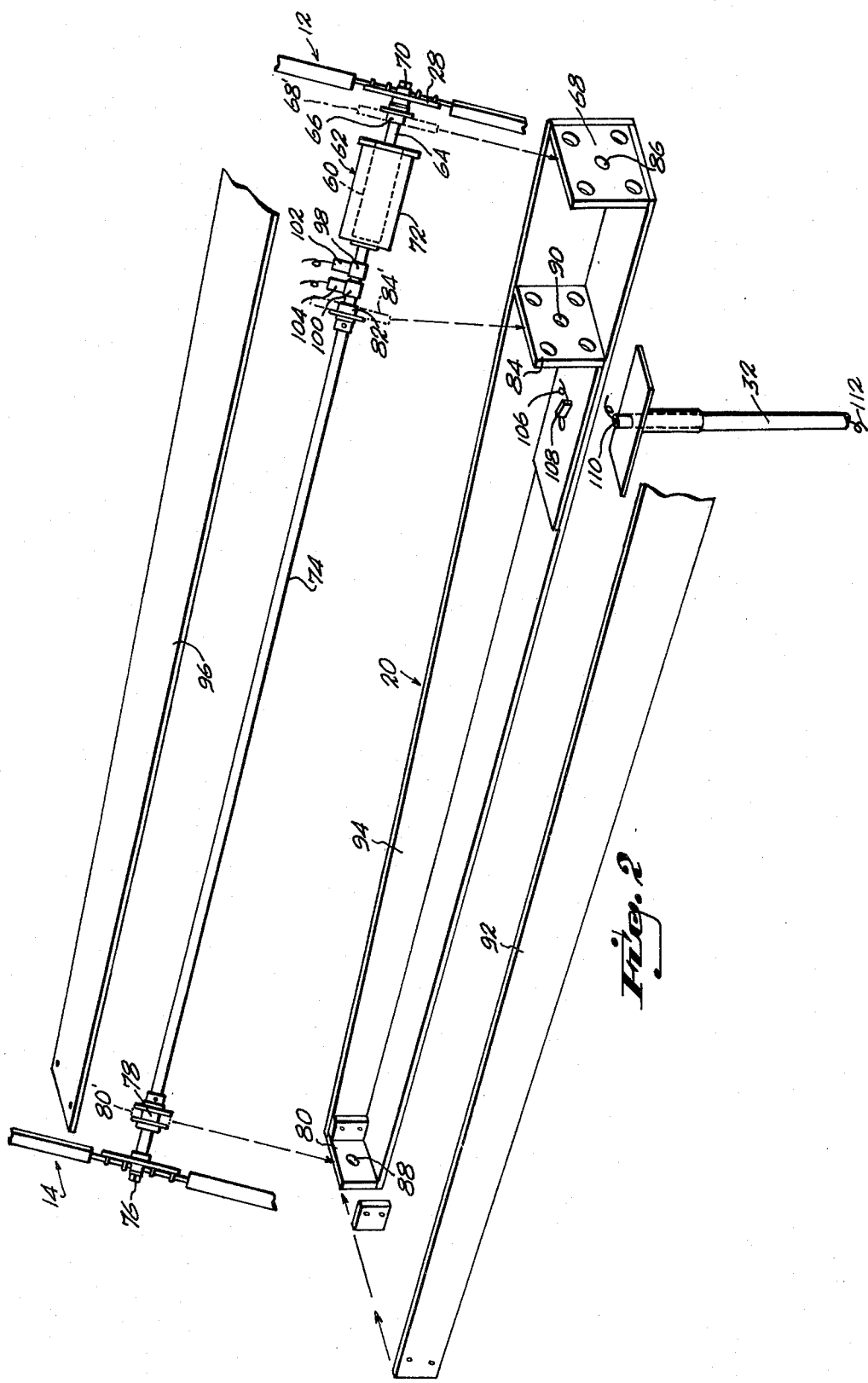

WIND ENERGY CONVERSION DEVICE

BACKGROUND OF THE PRESENT INVENTION

Most other wind machines, already available or under development have rotors which are simply overgrown airplane propellers, with very low efficiency, additionally making the machines heavy, clumsy and expensive. For example, the weight of other manufacturers' wind machines with 1500 W output varies from 600 to 1500 pounds. The total weight of the wind machine of the present invention with 1500 W output is only 110 pounds.

The extremely high output power is due to several important factors. First, the unique high speed two propeller system, with twin rotor generator. The clockwise rotating front prop has direct coupling to the internal rotor (power armature) and a counterclockwise rotating rear prop is coupled directly to the external rotor (field armature). As there is sufficient distance between the props, both develop closely the same speed, about 600 RPM in opposite directions in average wind and consequently the generator make 1200 RPM or double that produced by the single internal rotor utilized on other wind machines. Second, after extensive research, propellers with hollow blades, made of nonmetallic materials were designed. They are formed of synthetic fibers and tough plastic resins. Consequently, the oppositely rotating featherweight props in a driving connection to the inner and outer armatures provide a wind machine for converting wind energy into electrical energy with outstanding efficiency.

Recently an overnight power failure in the area where your applicant lives, near Key West, Fla., established the exceptional efficiency of the device. His experimental installation on the roof of a multi-room commercial building which includes a work shop with power tools and several wall type air conditions not only provided the electricity to his commercial building, but to his adjacent home and a neighbor's home by means of temporary electric conduits that he installed in connection with his aerogenerator. His commercial building has had no connection to a public power company during a lengthy period of experimentation and testing.

Therefore, one of the principal objects of the present invention is to provide a wind energy conversion device which is self-sufficient, extremely efficient and durable.

Another principal object of the invention is to provide a wind machine incorporating a pair of differential propellers respectively coupled to internal and external rotors of an electric generator.

A further object of the invention is to provide lightweight propeller blades formed of suitable synthetic materials.

Yet another object of the invention is to provide storage battery means connected to the output conduits from the aerogenerator.

Another object of the instant invention is to provide an inverter in the output from the storage batteries to convert the DC current from the batteries to AC current.

A still further object of the invention is to provide appropriate gauges in the electrical system to indicate the amperage, DC voltage and AC voltage, and a shut-off switch to prevent overcharging of the storage batteries.

BRIEF DESCRIPTION OF THE DRAWINGS

FIG. 1 is a perspective view of the differential propeller operated wind energy conversion device of the present invention;

FIG. 2 is an exploded view illustrating the arrangement of elements of the device in a main housing and the connection of the housing to a support mast; and FIG. 3 is a schematic illustration of a basic control panel and wiring diagram of the present invention.

DESCRIPTION OF A PREFERRED EMBODIMENT

With reference to the drawings in which like reference characters designate like or corresponding parts throughout the several views and with particular reference to FIG. 1, the aerogenerator designated generally at 10 includes a pair of differential propellers 12 and 14 which are rotatable outside of respective ends 16 and 18 of an elongated, substantially cylindrical housing 20. The individual propeller blades such as 22 are hollow formed of synthetic materials, for lightness, on a shaft 24 and are fixed by U-bolt and nut means 26 to propeller hubs 28 and 30 outwardly of the respective housing ends 16 and 18.

The housing 20 is pivotally mounted atop a mast 32 which includes a male upper end portion 34 for rotatable engagement in the tubular sleeve 36 of the female bracket 38, fixed by attachment means 40 to a bottom wall 42 of housing 20. The mast 32 is stabilized by a plurality of steel guy cables such as 44, and as illustrated is substantially forwardly of the center point of the housing length.

As best illustrated the blades 46 of the forward propeller blades 12 are pitched in a first direction to produce a clockwise rotation, indicated by arrows 48, relative to the wind direction 50. Blades 52 of the aft or rear propeller 14 are pitched in a second, opposite, direction to produce a counterclockwise direction of rotation indicated by arrows 54. While it may appear that the rear propeller 14 is in the shadow of the front prop and cannot produce much power, it is not so. Because of the partial vacuum behind the front prop and side pressures, the airflow bends inwardly and there is an exact predetermined distance between the props, the rear prop gets very closely the same wind pressures as the front prop. It means that if the front prop makes 600 RPM, the rear prop has virtually the same speed and the generator makes substantially 1,200 RPM.

With the twin differential props and the above described off-center privot, the device is more stable and reacts to wind direction changes much faster than single prop devices of this nature with a tail fin.

With particular reference to FIG. 2, the front prop 12 is directly coupled to the internal rotor 60 of the generator, indicated generally at 62, by shaft 64 which is journaled in a bearing 66 fixed in a front end wall 68 of housing 20. Prop hub 28 is centrally bolted at 70 to the outer extended end of shaft 64.

The rear prop 14 is directly coupled to the exterior rotor 72 of generator 62 by the elongated shaft 74 and is bolted thereto at 76. Shaft 74 is journaled in a bearing 78 in a rear wall 80 of housing 20 and a similar bearing 82 in an intermediate wall 84. The walls 68, 80 and 84 are indicated as 68', 80' and 84' in dot-dash lines relative to the exploded prop and shaft assembly to illustrate the positioning thereof in the bearing holes 86, 88, 90 of said walls. The housing is generally rectangular in cross sectional configuration and in addition to bottom wall 42 includes opposed side walls 92, 94 and top wall 96 which are all fixed in assembly by conventional attachment means such as screws.

The power take-off from the generator 62 is provided by first and second slip rings 98 and 100 and brushes 102 and 104 in a generally conventional manner. When a metal tubular mast 32 is used, a negative conductor lead 106 from the generator may be connected to a brush 108 in contact with a slip ring 110 carried on mast 32 provided said mast is properly grounded for lightening protection. A positive conductor lead 112 may be extended downwardly through the tubular mast 32.

To have sufficient power during windless or low wind periods, there is a need for storage batteries. A single battery 114 is illustrated in the wiring diagram, FIG. 3, however, a battery pack consisting of a plurality of batteries will obviously store more electrical energy. Negative and positive conductor leads 106, 112 are connected to battery 114 and an AC, DC inverter 116 is wired at 118, 120 to leads 106, 112. A pair of appropriate fuses 122, 124 are disposed in leads 106, 112. Output conductor leads 126, 128 from the inverter 116 provide AC, 120 V as indicated in FIG. 3.

A control panel 130 is provided which includes ampere gauge 132, connected in positive lead 112, a DC voltage gauge 134 connected between lead 106, 112 by leads 136, 138. An AC volt gauge 140 is connected at 142, 144 to the AC output 126, 128. With the semi-automatic operation provided by the above described system, an on-off switch 146 is provided in the positive lead 112. Switch 146 is moved to an off position only on occasion that the batteries get overcharged, this happens very seldom with a high capacity battery pack. The inverter is designed to disconnect automatically when battery voltage drops too low. A small portable back-up gasoline powered generator is connected to conductor leads 106, 112 by leads 150, 152. The gasoline powered generator (not shown) will cover occasional shortages of wind power and may have manual or automatic start.

A completely automatic system can be provided which has a relay to switch the generator on or off as the battery voltage requires. Also, relay switches may be provided to switch the generator off or to switch an extra load on when the batteries are being overcharged. A relay switch can also be provided to switch the system to line power or to the stand-by generator when the batteries are exhausted. The more sophisticated control system, above described, is not really essential, however, because the batteries used in the system have a very high capacity with up to ten years warranty and a design life of fifteen to twenty-five years.

The main housing may be generally rectangular in cross section and taper from a larger front end 16 to a smaller rear end 18. The number of propeller blades 22 may vary, for example, each propeller is preferably comprised of 4, 6 or 8 blades.

What is claimed is:

1. A wind energy conversion device to convert the wind energy to electrical energy comprising a main elongated generally horizontally disposed housing, a generator in said housing including inner and outer rotors, a front end multi-bladed propeller, journaled through a front end portion of said housing and being directly coupled to a first of said inner and outer rotors, said blades of said front end propeller being pitched in a first direction to rotate said first rotor in a first direction when said front propeller is exposed to and rotated by wind pressures; a rear end multi-bladed propeller, journaled through a rear end of said housing and being directly coupled to a second of said inner and outer rotors, said blades of said rear end propeller being pitched in a second direction to rotate said second rotor in a second direction, opposed to said first direction of said first rotor, when exposed to and rotated by the wind pressures; means to transmit electrical energy generated by said rotation of the first and second rotors of said generator to a remote location and means to support said housing at a predetermined elevation above ground level for proper exposure to prevailing wind forces.

2. The device as defined in claim 1 wherein said blades of said front end propeller are pitched to produce a clockwise rotation thereof and of said first rotor.

3. The device as defined in claim 2 wherein said first rotor comprises said inner rotor.

4. The device as defined in claim 1 wherein said blades of said rear end propeller are pitched to produce a counterclockwise rotation thereof and of said second rotor.

5. The device as defined in claim 4 wherein said second rotor comprises said outer rotor.

6. The device as defined in claim 1 wherein said means to transmit includes a pair of slip rings fixed relative to said inner rotor and a pair of brushes fixed to said housing connecting respectively between said slip rings and positive and negative conductor leads to said remote location.

7. The device as defined in claim 6 wherein said means to support comprises a mast for fixed mounting relative to any appropriate support structure such as a house or building roof and including a female receptacle fixed to a bottom wall of said main housing for pivotal engagement of a top portion of said mast, and a plurality of guy cables connected and tensioned between an upper portion of said mast and the support structure.

8. The device as defined in claim 7 wherein said female receptacle is fixed to said bottom wall rearwardly of but adjacent to a front end of said main housing and substantially forwardly of a mid point of the length of said housing.

9. The device as defined in claim 7 wherein said mast is formed of an electric conductive metal tube and includes a slip ring on a top end thereof for engagement by a brush connected to said negative lead.

10. The device as defined in claim 1 wherein said main housing is of a predetermined length to define a predetermined spacing between said front and rear propellers to achieve a maximum aerodynamic efficiency of said rear propeller relative to said front propeller as determined by the lengths of said propeller blades.

11. The device as defined in claim 1 wherein each individual blade of said front and rear propellers is formed of lightweight synthetic fibers bonded together by an appropriate very tough plastic resin.

12. The device as defined in claim 6 including storage battery means at said remote location electrically connected to said positive and negative conductor leads.

13. The device as defined in claim 12 wherein said storage battery means comprises a battery pack of a plurality of storage batteries.

14. The device as defined in claim 12 including an inverter electrically connected to said storage battery means to convert the DC from the batteries to 120 V, AC.

15. The device as defined in claim 12 including a control panel including an ampere gauge connected in said positive conductor lead to said battery means.

16. The device as defined in claim 12 including a DC voltage gauge connected across said positive and negative conductor leads to said battery means.

17. The device as defined in claim 14 including an AC voltage gauge connected across 120 V, AC output conductor leads from said inverter.

18. The device as defined in claim 15 including an on-off switch in said positive conductor lead to said positive conductor lead to said ampere gauge.

19. A wind energy generator to convert wind energy to electrical energy comprising:
 a pair of generator rotor shafts, each shaft having an outer end zone and said shafts being aligned along a common centerline, an internal generator rotor fixed on one of said pair of shafts and an exterior generator rotor fixed on the other of said pair of shafts, said exterior rotor being arranged about said internal rotor, and said rotors comprising a generator means; and
 an elongate housing having opposite ends and each housing end having an opening about the common centerline;
 said housing including means journalling each of said shafts and fixed rotor for independent rotation of the rotors within said housing, and
 the outer end zone of each of said shafts extending within the housing in opposite directions and away from said rotors;
 means to mount a multi-blade propeller for rotation exteriorly of each of the opposite housing ends with the outer end zone of each of said shafts, and
 said housing including means to mount the housing aloft to a vertical support for exposure to wind forces.

20. The device as set forth in claim 19 wherein a multi-blade propeller is mounted for rotation on the outer end zone of each of said shafts and includes means mutually interconnecting with said means to mount, a multi-blade propeller; and each of said of multi-blade propellers are counter pitched for relative counter-rotation of the propellers.

21. The device as set forth in claim 20 wherein said opposite ends of said housing are spaced from one another a predetermined distance greater than the outside diameter of the multi-blade propellers.

22. The device as set forth in claim 20 wherein said propellers comprise lightweight synthetic fibers bonded together by a carrier of plastic resin in the rigid range.

23. The device as set forth in claim 20 wherein said means to mount the housing to a vertical support is adjacent one of said ends of said elongate housing.

* * * * *